United States Patent
Ma et al.

(10) Patent No.: US 12,379,624 B2
(45) Date of Patent: Aug. 5, 2025

(54) MOBILE DEVICE AND LIQUID CRYSTAL SCREEN BACKLIGHT MODULE

(71) Applicant: JRD COMMUNICATION (SHENZHEN) LTD., Guangdong (CN)

(72) Inventors: Jitao Ma, Guangdong (CN); Yang Yu, Guangdong (CN); Ke Lin, Guangdong (CN)

(73) Assignee: JRD COMMUNICATION (SHENZHEN) LTD., Guangdong (CN)

(*) Notice: Subject to any disclaimer, the term of this patent is extended or adjusted under 35 U.S.C. 154(b) by 3 days.

(21) Appl. No.: 18/574,758

(22) PCT Filed: May 7, 2022

(86) PCT No.: PCT/CN2022/091529
§ 371 (c)(1),
(2) Date: Dec. 28, 2023

(87) PCT Pub. No.: WO2023/273613
PCT Pub. Date: Jan. 5, 2023

(65) Prior Publication Data
US 2024/0302692 A1    Sep. 12, 2024

(30) Foreign Application Priority Data
Jul. 2, 2021 (CN) .......................... 202121506732.X

(51) Int. Cl.
*G02F 1/13357* (2006.01)
*F21V 8/00* (2006.01)
(Continued)

(52) U.S. Cl.
CPC ..... *G02F 1/133603* (2013.01); *G02B 6/0073* (2013.01); *G02F 1/13338* (2013.01);
(Continued)

(58) Field of Classification Search
CPC ........... G02F 1/13338; G02F 1/133616; G02F 1/133603; G02F 1/133615; G06F 3/0412
See application file for complete search history.

(56) References Cited

U.S. PATENT DOCUMENTS

2003/0117790 A1    6/2003 Lee
2004/0109097 A1*   6/2004 Mai ..................... G02F 1/13338
                                                          349/12
(Continued)

FOREIGN PATENT DOCUMENTS

CN    102866536 A      1/2013
CN    106094355 A  *  11/2016
(Continued)

OTHER PUBLICATIONS

International Search Report in International application No. PCT/CN2022/091529, mailed on Aug. 11, 2022.
(Continued)

*Primary Examiner* — Mariceli Santiago
(74) *Attorney, Agent, or Firm* — PV IP PC; Wei Te Chung

(57) ABSTRACT

Disclosed in the present application is a liquid crystal screen backlight module. The liquid crystal screen backlight module comprises: a light emitting assembly; a light guide plate, one end face of the light guide plate being in full lamination with the light emitting assembly, and the other end face of the light guide plate being provided with a plurality of recessed dots; a touch panel, disposed on the end face of the light guide plate away from the light emitting assembly; and a transparent photoconductive member, one end face of the transparent photoconductive member being in frame lamination with the light guide plate, and the other end surface of the transparent photoconductive member being in full lamination with the touch panel.

20 Claims, 1 Drawing Sheet

(51) Int. Cl.
*G02F 1/1333* (2006.01)
*G02F 1/1335* (2006.01)
*G06F 3/041* (2006.01)

(52) U.S. Cl.
CPC .. *G02F 1/133612* (2021.01); *G02F 1/133615* (2013.01); *G06F 3/0412* (2013.01)

(56) References Cited

U.S. PATENT DOCUMENTS

2015/0003104 A1* 1/2015 Huang ................ G02B 6/005
  362/613
2015/0109546 A1* 4/2015 Tai .................... G02B 6/0055
  349/12

FOREIGN PATENT DOCUMENTS

| | | |
|---|---|---|
| CN | 207990364 U | 10/2018 |
| CN | 109541738 A | 3/2019 |
| CN | 111435186 A | 7/2020 |
| CN | 111640370 A | 9/2020 |
| CN | 112764152 A | 5/2021 |
| CN | 215416199 U | 1/2022 |
| JP | 2003122503 A | 4/2003 |
| KR | 20100062556 A | 6/2010 |
| WO | WO-03012620 A1 * | 2/2003 ......... G02F 1/13338 |

OTHER PUBLICATIONS

Written Opinion of the International Search Authority in International application No. PCT/CN2022/091529, mailed on Aug. 11, 2022.

* cited by examiner

MOBILE DEVICE AND LIQUID CRYSTAL SCREEN BACKLIGHT MODULE

This application claims priority to Chinese Patent Application No. 202121506732.X, filed with the Chinese Patent Office on Jul. 2, 2021, entitled "MOBILE DEVICE AND LIQUID CRYSTAL SCREEN BACKLIGHT MODULE", the disclosure of which is incorporated herein by reference in its entirety.

TECHNICAL FIELD

The present disclosure relates to the field of display devices, and more particularly to mobile devices and liquid crystal screen backlight modules.

BACKGROUND

As people's living standards continue to improve, electronic products are being updated increasingly. A communication mobile phone display module and a flat panel display module required for people's life have been developed from previous display modules having small-size, low-resolution, low-brightness, and ordinary viewing angles to present display modules having large-size, high-resolution, high-brightness, and full-view angles, and models of the display modules have also been developed from a functional machine without a touch function and a functional machine with a resistive touch function to a present capacitive touch frame lamination structure and a full lamination structure, thereby greatly improving the display effect of the display modules. Compared with a general structure of a display module, a full lamination Liquid Crystal Display (LCD) backlight module (LCM) of a display module has advantages of greatly reducing reflection and loss of light rays, making display pictures more realistic, reducing signal interference, reducing product thickness, and preventing dust from entering the display. A full lamination process is to seamlessly laminate a touch screen to a display module together with an optical adhesive, so as to improve a light transmittance and achieve a better display effect. There is no air between a screen of the display module and the touch screen in the full lamination process, which facilitates reducing reflection between a display panel and a glass of the display module, makes the screen display more transparent, and enhances the display effect of the screen. Another benefit of the full lamination process is that no dust enters into the screen. Close lamination of a touch module into a display panel also improves its strength. In addition, the full lamination process can effectively reduce interference caused by the noise of the display panel to a touch signal.

SUMMARY

Technical Problems

In a conventional production process, mesh points on a light guide plate may be filled with an adhesive in the manner of a full lamination, so that the light guide plate loses the effect of diffuse reflection and guiding of light. At the same time, there are disadvantages such as low yield, relatively expensive cost and the need to replace the entire screen once damaged in the manner of the full lamination. In contrast to the full lamination, the use of the frame lamination can avoid the above disadvantages of the full lamination. However, the use of the frame lamination may present an air-filled space between the light guide plate and the touch panel, which makes dust easy to enter into the display panel and increases the overall thickness.

Solutions to Problems

Technical Solutions

Embodiments of the present disclosure provides a mobile device and a liquid crystal screen backlight module.

One aspect of the embodiments of the present disclosure provides a liquid crystal screen backlight module, including: a light emitting assembly; a light guide plate, where one end face of the light guide plate is connected to the light emitting assembly in a full lamination, and another end face of the light guide plate is provided with a plurality of concave mesh points; a touch panel disposed on an end face of the light guide plate away from the light emitting assembly; and a transparent light conducting member, where one end face of the transparent light conducting member is connected to the light guide plate in a frame lamination, and another end face of the transparent light conducting member is connected to the touch panel in the full lamination.

In some embodiments of the present disclosure, the light guide plate is connected to the light emitting assembly by a transparent adhesive layer, and the end surfaces of the transparent light conducting member are respectively connected to the light guide plate and the touch panel through the transparent adhesive layer.

In some embodiments of the present disclosure, the transparent adhesive layer includes a transparent optical resin adhesive.

In some embodiments of the present disclosure, the transparent optical resin adhesive includes an Optically Clear Adhesive (OCA) or an Optical Clear Resin (OCR).

In some embodiments of the present disclosure, the transparent adhesive layer is distributed between two opposite end faces of the transparent light conducting member and the light guide plate in a shape of "□".

In some embodiments of the present disclosure, an edge of one end surface of the light guide plate close to the transparent light conducting member is recessed downward to form a stepped surface, and the transparent adhesive layer is disposed between the stepped surface and the transparent light conducting member.

In some embodiments of the present disclosure, vacuum extraction is performed between the transparent light conducting member and the light guide plate to enable the transparent light conducting member to closely laminate the light guide plate.

In some embodiments of the present disclosure, the light emitting assembly includes: LCD glass; a flexible circuit board disposed on an end face of the LCD glass close to the light guide plate; and Light Emitting Diode (LED) lamp beads electrically connected to the flexible circuit board to provide one or more line light sources.

In some embodiments of the present disclosure, the LED lamp beads are distributed on the LCD glass in a direct-lit manner or an edge-lit manner.

In some embodiments of the present disclosure, the transparent light conducting member includes a Polyester Film (PET) transparent film transparent film or a Polyimide Film (PI) transparent film.

Another aspect of the embodiments of the present disclosure further provides a mobile device, including a liquid crystal screen backlight module, where the liquid crystal screen backlight module includes: a light emitting assembly; a light guide plate, where one end face of the light guide plate is connected to the light emitting assembly in a full lamination, and another end face of the light guide plate is provided with a plurality of concave mesh points; a touch panel disposed on an end face of the light guide plate away from the light emitting assembly; and a transparent light conducting member, where one end face of the transparent light conducting member is connected to the light guide plate in a frame lamination, and another end face of the transparent light conducting member is connected to the touch panel in the full lamination.

In some embodiments of the present disclosure, the light guide plate is connected to the light emitting assembly by a transparent adhesive layer, and the end surfaces of the transparent light conducting member are respectively connected to the light guide plate and the touch panel through the transparent adhesive layer.

In some embodiments of the present disclosure, the transparent adhesive layer includes a transparent optical resin adhesive.

In some embodiments of the present disclosure, the transparent optical resin adhesive includes an Optically Clear Adhesive (OCA) or an Optical Clear Resin (OCR).

In some embodiments of the present disclosure, the transparent adhesive layer is distributed between two opposite end faces of the transparent light conducting member and the light guide plate in a shape of "☐".

In some embodiments of the present disclosure, an edge of one end surface of the light guide plate close to the transparent light conducting member is recessed downward to form a stepped surface, and the transparent adhesive layer is disposed between the stepped surface and the transparent light conducting member.

In some embodiments of the present disclosure, vacuum extraction is performed between the transparent light conducting member and the light guide plate to enable the transparent light conducting member to closely laminate the light guide plate.

In some embodiments of the present disclosure, the light emitting assembly includes: LCD glass; a flexible circuit board disposed on an end face of the LCD glass close to the light guide plate; and Light Emitting Diode (LED) lamp beads electrically connected to the flexible circuit board to provide one or more line light sources.

In some embodiments of the present disclosure, the LED lamp beads are distributed on the LCD glass in a direct-lit manner or an edge-lit manner.

In some embodiments of the present disclosure, the transparent light conducting member includes a Polyester Film (PET) transparent film transparent film or a Polyimide Film (PI) transparent film.

Beneficial Effects of the Present Disclosure

Beneficial Effects

The liquid crystal screen backlight module provided in any one of the embodiments of the present disclosure includes: the light emitting assembly; the light guide plate, where one end face of the light guide plate is connected to the light emitting assembly in a full lamination, and another end face of the light guide plate is provided with a plurality of concave mesh points; the touch panel disposed on an end face of the light guide plate away from the light emitting assembly; and the transparent light conducting member, where one end face of the transparent light conducting member is connected to the light guide plate in a frame lamination, and another end face of the transparent light conducting member is connected to the touch panel in the full lamination. The liquid crystal screen backlight module provided in the present disclosure can dispose a transparent light conducting member between the light guide plate and the touch panel while one end face of the transparent light conducting member is connected to the light guide plate in the frame lamination, and another end face of the transparent light conducting member is connected to the touch panel in the full lamination, so that the mesh points on the light guide plate are isolated from the transparent adhesive layer by the transparent light conducting member, thereby preventing the mesh points from being filled with the transparent adhesive layer and further preventing the light guide plate to lose the effect of diffuse reflection and guiding of light. Moreover, since the transparent light conducting member is made of the transparent thin film in the present disclosure, the thickness of the transparent thin film can be ignored to a certain extent, so that no or few voids exist when the transparent light conducting member and the light guide plate are connected in the frame lamination. In other embodiments, the vacuum processing can be performed between the transparent light conducting member and the light guide plate, so that the light conducting member closely laminates the surface of the light guide plate. Further, the transparent thin film does not affect transmission of light.

BRIEF DESCRIPTION OF THE DRAWINGS

Description of the Drawings

Technical solutions and other beneficial effects of the present disclosure are apparent below from detailed description of the embodiments of the present disclosure in combination with the accompanying drawings.

Figure 1:
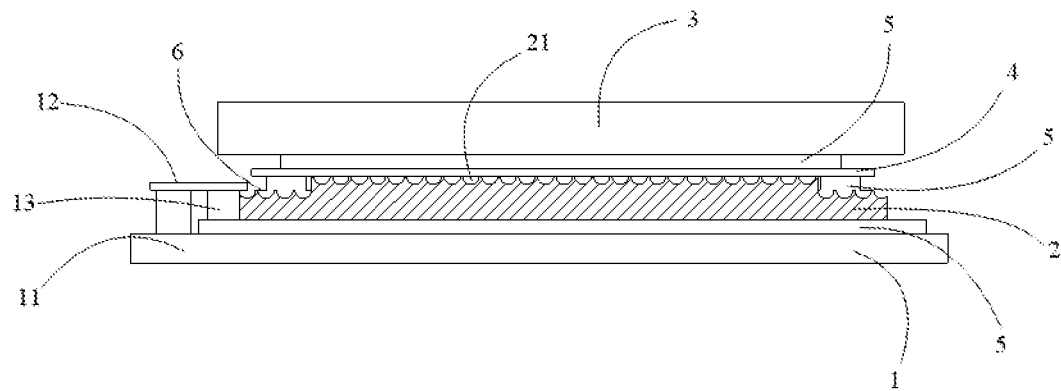

FIG. 1 is a schematic structural diagram of a liquid crystal screen backlight module according to some embodiments of the present disclosure.

Figure 2:
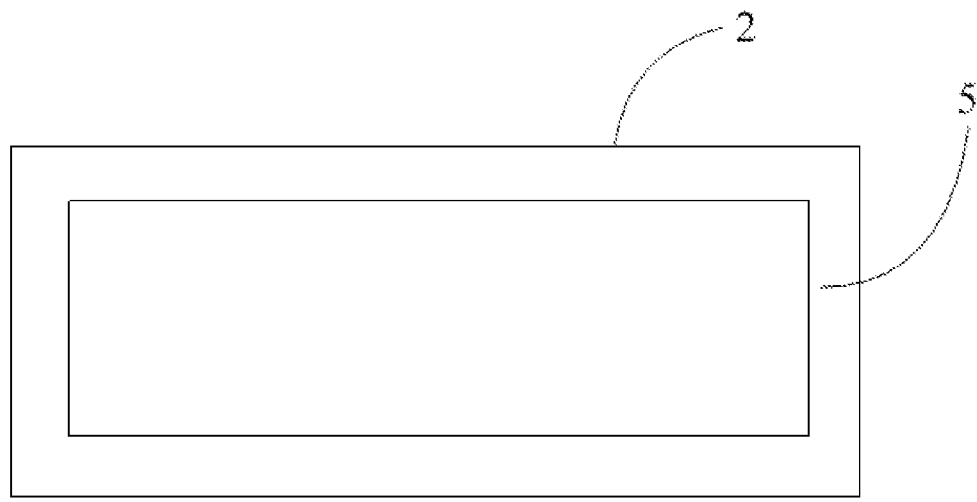

FIG. 2 is another structural schematic diagram of a liquid crystal screen backlight module according to some embodiments of the present disclosure.

Figure 3:
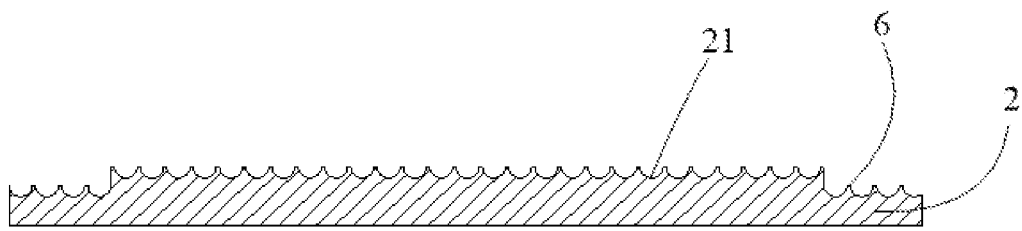

FIG. 3 is a schematic structural diagram of a light guide plate in a liquid crystal screen backlight module according to some embodiments of the present disclosure.

Reference signs: 1. Light emitting assembly; 11. LCD glass; 12. Flexible circuit board; 13. LED lamp beads; 2. Light guide plate; 21. Mesh point; 3. Touch panel; 4. Transparent light conducting member; 5. Transparent adhesive layer; 6. Stepped surface.

EMBODIMENTS OF THE PRESENT DISCLOSURE

Detailed Description

Technical solutions in embodiments of the present disclosure will be clearly and completely described below in conjunction with drawings in the embodiments of the present disclosure. Obviously, the described embodiments are only a part of embodiments of the present disclosure, rather than all the embodiments. Based on the embodiments in the present disclosure, all other embodiments obtained by those skilled in the art without creative work fall within the protection scope of the present disclosure.

In the description of the present disclosure, it should be understood that orientations or position relationships indicated by the terms "center", "longitudinal", "lateral", "length", "width", "thickness", "upper", "lower", "front", "rear", "left", "right", "vertical", "horizontal", "top", "bottom", "inside", "outside", "clockwise", and "counter-clockwise" are based on orientations or position relationships illustrated in the drawings. The terms are used to facilitate and simplify the description of the present disclosure, rather than indicate or imply that the devices or elements referred to herein are required to have specific orientations or be constructed or operate in the specific orientations. Accordingly, the terms should not be construed as limiting the present disclosure. In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plurality" is two or more, unless otherwise specifically defined.

In the description of the present disclosure, it should be noted that the terms "installation", "connection" and "coupling" should be understood in a broad sense, unless otherwise clearly specified and defined. For example, it can be a fixed connection, a detachable connection, or integrated connection; it can be a mechanical connection, an electrical connection or can communicate with each other; it can be directly connected or indirectly connected through an intermediary, it can also be the connection between two elements or the interaction between two elements. Those ordinary skilled in the art can understand the specific meanings of the above terms in the present disclosure according to specific situations.

In the present disclosure, it should be noted that unless otherwise clearly defined and limited, a first feature "on" or "under" a second feature may mean that the first feature directly contacts the second feature, or that the first feature contacts the second feature via an additional feature there between instead of directly contacting the second feature. Moreover, the first feature "on", "above", and "over" the second feature may mean that the first feature is right over or obliquely upward over the second feature or mean that the first feature has a horizontal height higher than that of the second feature. The first feature "under", "below", and "beneath" the second feature may mean that the first feature is right beneath or obliquely downward beneath the second feature or mean that horizontal height of the first feature is lower than that of the second feature.

The following description provides various embodiments or examples for implementing various structures of the present disclosure. To simplify the description of the present disclosure, parts and settings of specific examples are described as follows. Certainly, they are only illustrative, and are not intended to limit the present disclosure. Further, reference numerals and reference letters may be repeated in different examples. This repetition is for purposes of simplicity and clarity and does not indicate a relationship of the various embodiments and/or the settings. Furthermore, the present disclosure provides specific examples of various processes and materials, however, disclosures of other processes and/or other materials may be appreciated those skilled in the art.

In a conventional production process, in order to improve assembly stability between the light guide plate 2 and the touch panel 3 of the backlight module, a full lamination is generally implemented between the light guide plate 2 and the touch panel 3 with an adhesive. However, the mesh points 21 on the light guide plate 2 may be filled with an adhesive in the manner of the full lamination, so that the light guide plate 2 loses the effect of diffuse reflection and guiding of light. At the same time, there are disadvantages such as low yield, relatively expensive cost and the need to replace the entire screen once damaged in the manner of the full lamination. In contrast to the full lamination, the frame lamination is also used in the market to avoid the above disadvantages of the full lamination. However, the use of the frame lamination may present an air-filled space between the light guide plate 2 and the touch panel 3, which makes dust easy to enter into the display panel and increases the overall thickness. In order to solve the above problems, some embodiments of the present disclosure provide a liquid crystal screen backlight module.

Specifically, referring to FIGS. 1-3, some embodiments of the present disclosure provide a liquid crystal screen backlight module, including: a light emitting assembly 1; a light guide plate 2, where one end face of the light guide plate 2 is connected to the light emitting assembly 1 in a full lamination, and another end face of the light guide plate 2 is provided with a plurality of concave mesh points 21; a touch panel 3 disposed on one end face of the light guide plate 2 away from the light emitting assembly 1; and a transparent light conducting member 4, where one end face of the transparent light conducting member 4 is connected to the light guide plate 2 in a frame lamination, and another end face of the transparent light conducting member 4 is connected to the touch panel 3 in the full lamination.

In the embodiments, the liquid crystal screen backlight module specifically includes the light emitting assembly 1, the light guide plate 2, the touch panel 3, and the transparent light conducting member 4.

It should be explained that the full lamination and the frame lamination mentioned in the present embodiments (as shown in FIG. 2) are implemented by a transparent adhesive layer 5. Specifically, the light guide plate 2 is connected to the light emitting assembly 1 by the transparent adhesive layer 5, and the end surfaces of the transparent light conducting member 4 are respectively connected to the light guide plate 2 and the touch panel 3 through the transparent adhesive layer 5.

In some embodiments of the present disclosure, the transparent adhesive layer 5 includes a transparent optical resin adhesive. The transparent optical resin adhesive includes an Optically Clear Adhesive (OCA) or an Optical Clear Resin (OCR). The Optically Clear Adhesive (OCA) is a double-sided adhesive tape of a substrate-free material obtained by forming an optical acrylic glue into a substrate-free and then attaching a layer of release film to each of the upper and lower layers of the substrate-free. Since the OCA is generally manufactured in the form of the double-sided adhesive tape, it is also referred to as an optical adhesive tape or an optical double-sided adhesive tape. The Optical Clear Resin (OCR) is one type of optical glue, and is also referred to as a liquid optical glue, an optical water glue, or an LOCA because the glue is liquid. The glue is colorless and transparent after curing, has a light transmittance of 98% or more, and has the characteristics of low curing shrinkage and resistance to yellowing. In the field of the full lamination, the OCR has unique advantages over conventional OCA tapes in the fields of large size, curved surfaces, harsh environments, and the like.

The light emitting assembly 1 included in the liquid crystal screen backlight module adopts an LCD light emitting assembly 1, where the LCD is short for Liquid Crystal Display, i.e., a liquid crystal display. The LCD is constructed in such a manner that a liquid crystal cell is disposed between two parallel glass substrates, a thin film transistor (TFT) is disposed on the glass of the lower substrate, and a color filter is disposed on the glass of the upper substrate, so that rotation directions of liquid crystal molecules are controlled by changing a signal and a voltage on the TFT, thereby achieving a display purpose of controlling whether polarized light of each of pixels is emitted or not. Since the LCD light emitting assembly 1 is a conventional component, the configuration description of the LCD light emitting assembly 1 is simplified in the embodiments, and only the main components such as the LCD glass 11, the flexible circuit board 12 (FPC), and the LED lamp beads 13 are described. The LCD flexible circuit board 12 is disposed on one end face of the LCD glass 11 close to the light guide plate 2, and the LED lamp beads 13 are electrically connected to the flexible circuit board 12 to provide one or more line light sources. Further, the LED lamp beads 13 are distributed on the LCD glass 11 in a direct-lit manner or an edge-lit manner. Since the edge-lit manner can reduce the distance between the LCD glass 11 and the light guide plate 2 and reduce the thickness of the backlight module as a whole, the LED lamp beads 13 are preferably mounted in the edge-lit manner in the present embodiments.

A light guide plate 2 (LGP) is included in the liquid crystal screen backlight module, where one end face of the light guide plate 2 is connected to the light emitting assembly 1 in a full lamination, and another end face of the light guide plate 2 is provided with a plurality of concave mesh points 21. When light rays are emitted to respective ones of the mesh points 21, the reflected light rays are diffused to the respective angles, and then a reflection condition is destroyed to enable the light rays to be emitted from the front surface of the light guide plate 2. The light guide plate 2 is made to emit light uniformly by various sparse and different mesh points 21, and the linear light sources emitted by the light emitting assembly 1 are converted into a surface light source.

A touch panel (short for TP) included in the liquid crystal screen backlight module is disposed on one end face of the light guide plate 2 away from the light emitting assembly 1, so that a screen touch function is realized, and a purpose of human-computer interaction is reached.

One end face of the transparent light conducting member 4 included in the liquid crystal screen backlight module is connected to the light guide plate 2 in a frame lamination, and another end face of the transparent light conducting member 4 is connected to the touch panel 3 in a full lamination.

In some embodiments of the present disclosure, the transparent light conducting member 4 includes a Polyester Film (PET) transparent film transparent film or a Polyimide Film (PI) transparent film.

The Polyester Film (PET) transparent film is a more comprehensive packaging film. The film has good transparency and luster; good airtightness and fragrance retention; moderate moisture resistance and decreasing of the moisture permeability at a low temperature. The PET transparent film has excellent mechanical property, its strength and toughness is the best of all thermoplastics, and its tensile strength and impact strength is much higher than those of general films; and the PET transparent film is good in rigidity, stable in size, and suitable for secondary processing such as printing and paper bags.

The Polyimide Film (PI) transparent film is the most heat-resistant variety among the known industrial polymeric materials, and is widely used in the high-tech field as a film, a coating, a plastic, a composite material, an adhesive, a foam, a fiber, a separation film, a liquid crystal alignment agent, a photoresist, and the like.

In the present solution, by disposing the transparent light conducting member 4 between the light guide plate 2 and the touch panel 3 while one end face of the transparent light conducting member 4 is connected to the light guide plate 2 in the frame lamination, and another end face of the transparent light conducting member 4 is connected to the touch panel 3 in the full lamination, so that the mesh points 21 on the light guide plate 2 are isolated from the transparent adhesive layer 5 by the transparent light conducting member 4, thereby preventing the mesh points 21 from being filled with the transparent adhesive layer 5 and further preventing the light guide plate 2 to lose the effect of diffuse reflection and guiding of light. Moreover, since the transparent light conducting member 4 is made of the transparent thin film in the present disclosure, the thickness of the transparent thin film can be ignored to a certain extent, so that no or few voids exist when the transparent light conducting member 4 and the light guide plate 2 are connected in the frame lamination. In other embodiments, the vacuum processing can be performed between the transparent light conducting member and the light guide plate 2, so that the light conducting member closely laminates the surface of the light guide plate 2. Further, the transparent thin film does not affect transmission of light.

In some embodiments of the present disclosure, the transparent adhesive layer 5 is distributed between two opposite end faces of the transparent light conducting member 4 and the light guide plate 2 in a shape of "▢".

In the embodiment of the present disclosure, the transparent adhesive layer 5 is distributed between two opposite end faces of the transparent light conducting member 4 and the light guide plate 2 in a shape of "▢", that is, the transparent light conducting member 4 is connected to the light guide plate 2 in a frame lamination.

In some embodiments of the present disclosure, an edge of one end surface of the light guide plate 2 close to the transparent light conducting member 4 is recessed downward to form a stepped surface 6, and the transparent adhesive layer 5 is disposed between the stepped surface 6 and the transparent light conducting member 4.

In some embodiments of the present disclosure, by disposing the downward recessed stepped surface at the edge of one end surface of the light guide plate 2 close to the transparent light conducting member 4 and further disposing the transparent adhesive layer 4 between the stepped surface 6 and the transparent light conducting member 4, a contact area between the transparent adhesive layer 5 and the light guide plate 2 can be further increased, thereby improving connection stability between the transparent light conducting member 4 and the light guide plate 2.

Another aspect of another embodiment of the present disclosure provides a mobile device, including the liquid crystal screen backlight module as described above in any one of the embodiments of the present disclosure.

In the embodiment, the liquid crystal screen backlight module may be applied to the mobile device, which may be a mobile phone or a tablet or other mobile device. Compared with the mobile device having a general liquid crystal screen backlight module, the mobile device having the liquid crystal screen backlight module of the present disclosure has better performance.

The liquid crystal screen backlight module includes: a light emitting assembly 1; a light guide plate 2, where one end face of the light guide plate 2 is connected to the light emitting assembly 1 in a full lamination, and another end face of the light guide plate 2 is provided with a plurality of concave mesh points 21; a touch panel 3 disposed at one end face of the light guide plate 2 away from the light emitting assembly 1; and a transparent light conducting member 4, where one end face of the transparent light conducting member 4 is connected to the light guide plate 2 in a frame lamination, and another end face of the transparent light conducting member 4 is connected to the touch panel 3 in the full lamination.

In some embodiments of the present disclosure, the light guide plate 2 is connected to the light emitting assembly 1 by a transparent adhesive layer 5, and the end surfaces of the transparent light conducting member 4 are respectively connected to the light guide plate 2 and the touch panel 3 through the transparent adhesive layer 5.

In some embodiments of the present disclosure, the transparent adhesive layer 5 includes a transparent optical resin adhesive.

In some embodiments of the present disclosure, the transparent optical resin adhesive includes an Optically Clear Adhesive (OCA) or an Optical Clear Resin (OCR).

In some embodiments of the present disclosure, the transparent adhesive layer 5 is distributed between two opposite end faces of the transparent light conducting member 4 and the light guide plate 2 in a shape of "☐".

In some embodiments of the present disclosure, an edge of one end surface of the light guide plate 2 close to the transparent light conducting member 4 is recessed downward to form a stepped surface 6, and the transparent adhesive layer 5 is disposed between the stepped surface 6 and the transparent light conducting member 4.

In some embodiments of the present disclosure, vacuum extraction is performed between the transparent light conducting member 4 and the light guide plate 2 to enable the transparent light conducting member 4 to closely laminate the light guide plate 2.

In some embodiments of the present disclosure, the light emitting assembly 1 includes: LCD glass 11; a flexible circuit board 12 disposed on an end face of the LCD glass 11 close to the light guide plate 2; and Light Emitting Diode (LED) lamp beads 13 electrically connected to the flexible circuit board 12 to provide one or more line light sources.

In some embodiments of the present disclosure, the LED lamp beads 13 are distributed on the LCD glass 11 in a direct-lit manner or an edge-lit manner.

In some embodiments of the present disclosure, the transparent light conducting member 4 includes a Polyester Film (PET) transparent film transparent film or a Polyimide Film (PI) transparent film.

In summary, the embodiments of the present disclosure provide a mobile device and a liquid crystal screen backlight module, where the liquid crystal screen backlight module includes: a light emitting assembly 1; a light guide plate 2, where one end face of the light guide plate 2 is connected to the light emitting assembly 1 in a full lamination, and another end face of the light guide plate 2 is provided with a plurality of concave mesh points 21; a touch panel 3 disposed on an end face of the light guide plate 2 away from the light emitting assembly 1; and a transparent light conducting member 4, where one end face of the transparent light conducting member 4 is connected to the light guide plate 2 in a frame lamination, and another end face of the transparent light conducting member 4 is connected to the touch panel 3 in the full lamination. By disposing a transparent light conducting member 4 between the light guide plate 2 and the touch panel while one end face of the transparent light conducting member 4 is connected to the light guide plate 2 in the frame lamination, and another end face of the transparent light conducting member 4 is connected to the touch panel 3 in the full lamination, so that the mesh points 21 on the light guide plate 2 are isolated from the transparent adhesive layer 5 by the transparent light conducting member 4, thereby preventing the mesh points 21 from being filled with the transparent adhesive layer 5 and further preventing the light guide plate 2 to lose the effect of diffuse reflection and guiding of light. Moreover, since the transparent light conducting member 4 is made of the transparent thin film in the present disclosure, the thickness of the transparent thin film can be ignored to a certain extent, so that no or few voids exist when the transparent light conducting member 4 and the light guide plate 2 are connected in the frame lamination. In other embodiments, the vacuum processing can be performed between the transparent light conducting member and the light guide plate 2, so that the light conducting member closely laminates the surface of the light guide plate 2. Further, the transparent thin film does not affect transmission of light.

In the foregoing embodiments, descriptions of the embodiments are emphasized. A portion that is not described in detail in an embodiment may refer to related descriptions in another embodiment.

The electronic device provided in the embodiments of the present disclosure are described in detail above. In this specification, principles and implementations of the present disclosure are illustrated by applying specific examples herein. The description of the above embodiments is only used to help understand the technical solutions and core ideas of the present disclosure; those of ordinary skill in the art should understand that it is still possible to modify the technical solutions recorded in the foregoing embodiments, and these modifications or replacements do not cause the essence of the corresponding technical solutions to deviate from the scope of the technical solutions of the embodiments of the present disclosure.

What is claimed is:

1. A liquid crystal screen backlight module, comprising:
    a light emitting assembly;
    a light guide plate, wherein one end face of the light guide plate is connected to the light emitting assembly in a full lamination, and another end face of the light guide plate is provided with a plurality of concave mesh points;
    a touch panel disposed on an end face of the light guide plate away from the light emitting assembly; and
    a transparent light conducting member, wherein one end face of the transparent light conducting member is connected to the light guide plate in a frame lamination, and another end face of the transparent light conducting member is connected to the touch panel in the full lamination.

2. The liquid crystal screen backlight module of claim 1, wherein the light guide plate is connected to the light emitting assembly by a transparent adhesive layer; and
    the end surfaces of the transparent light conducting member are connected to the light guide plate and the touch panel through the transparent adhesive layer, respectively.

3. The liquid crystal screen backlight module of claim 2, wherein the transparent adhesive layer comprises a transparent optical resin adhesive.

4. The liquid crystal screen backlight module of claim 3, wherein the transparent optical resin adhesive includes an Optically Clear Adhesive (OCA) or an Optical Clear Resin (OCR).

5. The liquid crystal screen backlight module of claim 2, wherein the transparent adhesive layer is distributed between two opposite end faces of the transparent light conducting member and the light guide plate in a shape of a rectangle.

6. The liquid crystal screen backlight module of claim 2, wherein an edge of one end surface of the light guide plate close to the transparent light conducting member is recessed downward to form a stepped surface, and the transparent adhesive layer is disposed between the stepped surface and the transparent light conducting member.

7. The liquid crystal screen backlight module of claim 1, wherein vacuum extraction is performed between the transparent light conducting member and the light guide plate to enable the transparent light conducting member to closely laminate the light guide plate.

8. The liquid crystal screen backlight module of claim 1, wherein the light emitting assembly comprises:
   Liquid Crystal Display (LCD) glass;
   a flexible circuit board disposed on an end face of the LCD glass close to the light guide plate; and
   Light Emitting Diode (LED) lamp beads electrically connected to the flexible circuit board to provide one or more line light sources.

9. The liquid crystal screen backlight module of claim 8, wherein the LED lamp beads are distributed on the LCD glass in a direct-lit manner or an edge-lit manner.

10. The liquid crystal screen backlight module of claim 1, wherein the transparent light conducting member comprises a Polyester Film (PET) transparent film transparent film or a Polyimide Film (PI) transparent film.

11. A mobile device, comprising a liquid crystal screen backlight module, wherein the liquid crystal screen backlight module comprises:
   a light emitting assembly;
   a light guide plate, wherein one end face of the light guide plate is connected to the light emitting assembly in a full lamination, and another end face of the light guide plate is provided with a plurality of concave mesh points;
   a touch panel disposed on an end face of the light guide plate away from the light emitting assembly; and
   a transparent light conducting member, wherein one end face of the transparent light conducting member is connected to the light guide plate in a frame lamination, and another end face of the transparent light conducting member is connected to the touch panel in the full lamination.

12. The mobile device of claim 11, wherein the light guide plate is connected to the light emitting assembly by a transparent adhesive layer; and
   the end surfaces of the transparent light conducting member are respectively connected to the light guide plate and the touch panel through the transparent adhesive layer.

13. The mobile device of claim 12, wherein the transparent adhesive layer comprises a transparent optical resin adhesive.

14. The mobile device of claim 13, wherein the transparent optical resin adhesive includes an Optically Clear Adhesive (OCA) or an Optical Clear Resin (OCR).

15. The mobile device of claim 12, wherein the transparent adhesive layer is distributed between two opposite end faces of the transparent light conducting member and the light guide plate in a shape of a rectangle.

16. The mobile device of claim 12, wherein an edge of one end surface of the light guide plate close to the transparent light conducting member is recessed downward to form a stepped surface, and the transparent adhesive layer is disposed between the stepped surface and the transparent light conducting member.

17. The mobile device of claim 11, wherein vacuum extraction is performed between the transparent light conducting member and the light guide plate to enable the transparent light conducting member to closely laminate the light guide plate.

18. The mobile device of claim 11, wherein the light emitting assembly comprises:
   Liquid Crystal Display (LCD) glass;
   a flexible circuit board disposed on an end face of the LCD glass close to the light guide plate; and
   Light Emitting Diode (LED) lamp beads electrically connected to the flexible circuit board to provide one or more line light sources.

19. The mobile device of claim 18, wherein the LED lamp beads are distributed on the LCD glass in a direct-lit manner or an edge-lit manner.

20. The mobile device of claim 11, wherein the transparent light conducting member comprises a Polyester Film (PET) transparent film transparent film or a Polyimide Film (PI) transparent film.

* * * * *